United States Patent
Su et al.

(10) Patent No.: US 6,872,901 B2
(45) Date of Patent: Mar. 29, 2005

(54) AUTOMATIC ACTUATION OF DEVICE ACCORDING TO UV INTENSITY

(75) Inventors: Wen-Wei Su, Taoyuan (TW);
Kuei-Hung Chen, Taoyuan (TW);
Shun-Hsiang Hsiao, Taoyuan (TW);
Hsien-Jen Wu, Taoyuan (TW)

(73) Assignee: Exon Science Inc., Taoyuan (TW)

( * ) Notice: Subject to any disclaimer, the term of this patent is extended or adjusted under 35 U.S.C. 154(b) by 103 days.

(21) Appl. No.: 10/453,599

(22) Filed: Jun. 4, 2003

(65) Prior Publication Data

US 2004/0108191 A1 Jun. 10, 2004

(30) Foreign Application Priority Data

Nov. 25, 2002 (TW) ......................................... 91134220 A
Jan. 24, 2003 (TW) ......................................... 92101541 A

(51) Int. Cl.$^7$ ............................................... H01J 47/00
(52) U.S. Cl. .................... 200/61.02; 250/372; 250/431; 359/357; 359/359
(58) Field of Search ....................... 200/61.02; 250/372, 250/373, 431, 432; 359/357, 359, 350, 361

(56) References Cited

U.S. PATENT DOCUMENTS

| 3,948,772 A | | 4/1976 | Ellner |
| 4,493,996 A | * | 1/1985 | Sterling .................. 250/227.11 |
| 5,382,791 A | * | 1/1995 | Leff et al. .................... 250/221 |
| 5,461,226 A | * | 10/1995 | Nicoli et al. .......... 250/214 VT |
| 6,222,141 B1 | * | 4/2001 | Johansson et al. ....... 200/61.02 |
| 6,335,529 B1 | * | 1/2002 | Sekii et al. .................. 250/372 |
| 6,407,401 B1 | * | 6/2002 | Kondoh et al. ............. 250/551 |

FOREIGN PATENT DOCUMENTS

| CN | 2234380 Y | 9/1996 |
| CN | 2242053 Y | 12/1996 |
| CN | 1295239 | 5/2001 |
| DE | 37 02 449 A1 | 8/1987 |
| DE | 44 46 920 A1 | 7/1996 |
| EP | 0 470 866 A1 | 2/1992 |
| EP | 1 288 070 A2 | 3/2003 |
| JP | 06-281967 | 10/1994 |
| TW | 433203 | 5/1988 |
| TW | 487799 | 5/2000 |
| WO | 01/92839 A2 | 12/2001 |

* cited by examiner

Primary Examiner—K. Lee
(74) Attorney, Agent, or Firm—Bacon & Thomas PLLC

(57) ABSTRACT

A device automatically actuated according to UV intensity includes a UV detector generating an electric signal indicative of a UV intensity of a light received thereby; a comparator in communication with the UV detector, receiving the electric signal to compare the UV intensity with a first threshold value, and asserting an actuating signal when the UV intensity is in a predetermined correlation with the first threshold value; and an actuated object in communication with the comparator, actuated to change a state thereof in response to the actuating signal. The actuated object can be an anti-glare rearview mirror, a sunshade curtain, a headlamp, or a transmittance-adjustable window of a vehicle. The actuated object can be a sunshade curtain or a transmittance-adjustable window of a building.

22 Claims, 5 Drawing Sheets

AUTOMATIC ACTUATION OF DEVICE ACCORDING TO UV INTENSITY

FIELD OF THE INVENTION

The present invention relates to a device capable of being actuated automatically, and more particularly to a device automatically actuated according to UV intensity.

BACKGROUND OF THE INVENTION

As being proven medically, UV is harmful to human's skin to a large extent. Unfortunately, due to the destruction of the ozone layer that is supposed to be able to protect people's skin from the direct UV radiation, people are subject to exposure under strong UV radiation. In practice, it is difficult for people to know the intensity of the UV radiation, and thus proper protection measure cannot be adopted timely. Day after day, skin is possibly diseased.

SUMMARY OF THE INVENTION

Therefore, an object of the present invention is to provide a device automatically actuated to protect people from UV radiation when the UV intensity is too high.

A first aspect of the present invention relates to a device automatically actuated according to UV intensity. The device comprises a UV detector generating an electric signal indicative of a UV intensity of a light received thereby; a comparator in communication with the UV detector, receiving the electric signal to compare the UV intensity with a first threshold value, and asserting an actuating signal when the UV intensity is in a predetermined correlation with the first threshold value; and an actuated object in communication with the comparator, actuated to change a state thereof in response to the actuating signal.

In an embodiment, the actuating signal is asserted when the UV intensity is lower than the first threshold value.

For example, the actuated object is an anti-glare rearview mirror module of a vehicle. The module comprises a photosensor oriented to receive a rearward light of the vehicle and asserting a control signal when an intensity of the rearward light is higher than a second threshold value; and an electrochromic mirror in communication with the photosensor, changing a reflectance thereof in response to the actuating signal and the control signal.

For another example, the actuated object is a lamp module. The lamp module is in communication with the comparator, and changes from an OFF state to an ON state to illuminate in response to the actuating signal. On the other hand, the lamp module is changed from the ON state to the OFF state to be put out and the reflectance of the electrochromic mirror recovers to an unchanged initial value when the UV intensity becomes higher than the first threshold value. If the actuated object is a headlamp nodule of a vehicle, it is preferably comprises a headlamp actuated to illuminate in response to a power signal from a power source; and a controller switch electrically connected to the headlamp, the power source and the comparator, conducted to allowing the headlamp to receive the power signal when the UV intensity is lower than the first threshold value, and off-circuited to stop the headlamp to receive the power signal when the UV intensity is higher than the first threshold value.

In another embodiment, the actuating signal is asserted when the UV intensity is higher than the first threshold value.

For example, the actuated object is a sunshade curtain module. The module is in communication with the comparator, and changes from an OFF state to an ON state to block sunlight in response to the actuating signal. On the other hand, the sunshade curtain module is changed from the ON state to the OFF state to retract when the UV intensity becomes lower than the first threshold value. If the actuated object is a sunshade curtain module of a vehicle, it preferably comprises a curtain body actuated to move in response to a power signal from a power source; and a control circuit electrically connected to the curtain body, the power source and the comparator, allowing the curtain body to receive the power signal to move in a first direction so as to shield a window of the vehicle when the UV intensity is higher than the first threshold value, and allowing the curtain body to receive the power signal to move in a second direction so as to expose the window when the UV intensity is lower than the first threshold value.

For another example, the actuated object is an electrochromic window in communication with the comparator, and changes from an initial transmittance state to a lower transmittance state in response to the actuating signal. The electrochromic window is changed from the lower transmittance state to the initial transmittance state when the UV intensity becomes lower than the first threshold value. The electrochromic window can be a window of a vehicle or a building.

Preferably, the device automatically actuated according to UV intensity is applied to a vehicle, and the UV detector, the comparator and the actuated object communicate with one another via a vehicular digital bus such as a controller area network (CAN) bus or a vehicle area network (VAN) bus.

A second aspect of the present invention relates to a device automatically actuated to prevent strong UV radiation from entering a vehicle. The device comprises a UV detector mounted on the vehicle, and generating an electric signal indicative of a UV intensity of a light received thereby; a comparator in communication with the UV detector, receiving the electric signal to compare the UV intensity with a first threshold value, and asserting an actuating signal when the UV intensity is higher than the first threshold value; and an actuated object in communication with the comparator, actuated to change a state thereof in response to the actuating signal.

A third aspect of the present invention relates to a device automatically actuated to prevent strong UV radiation from entering a building. The device comprises a UV detector mounted on the building, and generating an electric signal indicative of a UV intensity of a light received thereby; a comparator in communication with the UV detector, receiving the electric signal to compare the UV intensity with a first threshold value, and asserting an actuating signal when the UV intensity is higher than the first threshold value; and an actuated object in communication with the comparator, actuated to change a state thereof in response to the actuating signal.

The actuated object, for example, can be a sunshade curtain module and/or an electrochromic window of the vehicle or the building.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
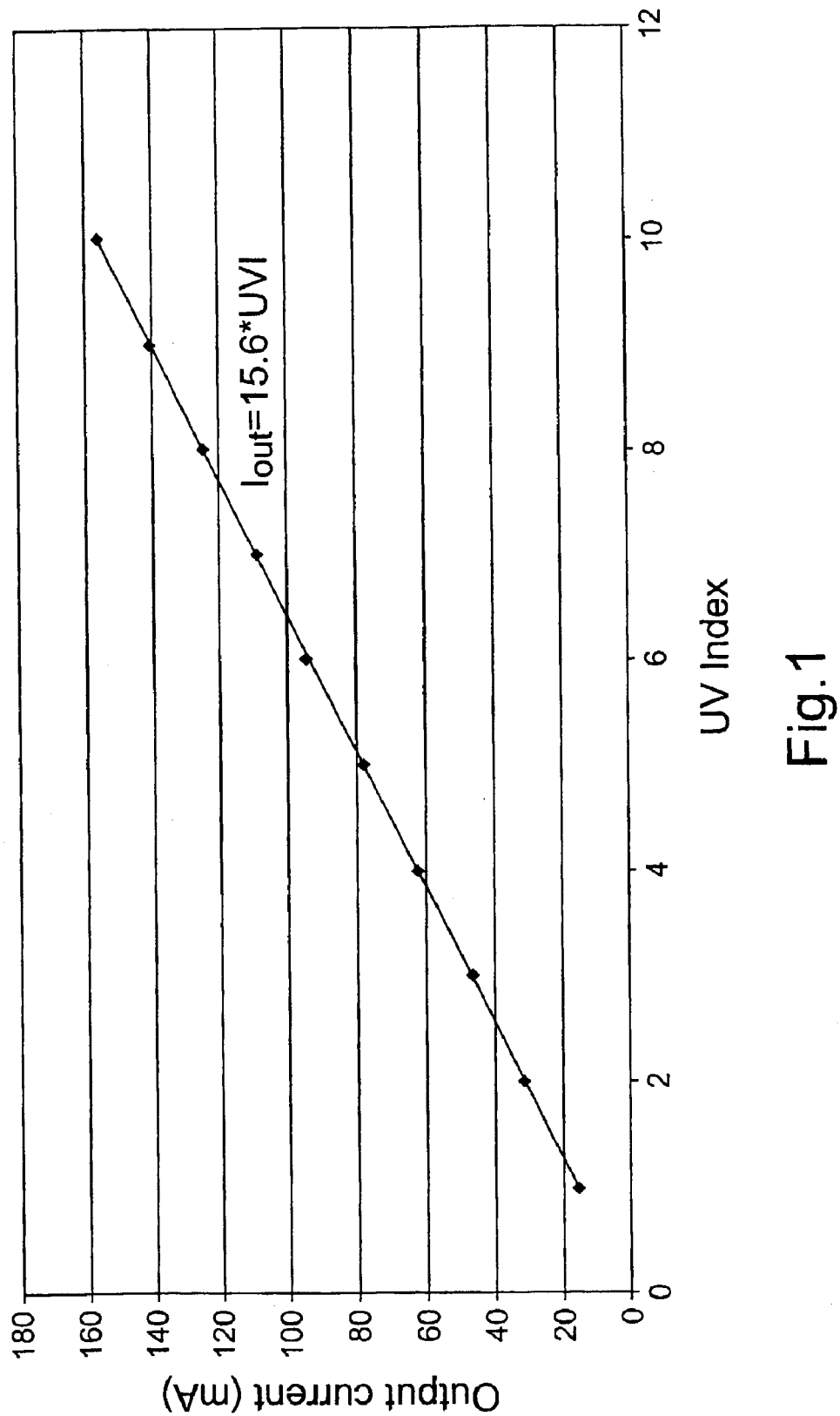
FIG. 1 is an output current vs. UV intensity plot of a UV detector.

In order to protect people from UV radiation when the UV intensity is too high, a UV detector is required to realize the UV intensity first. Please refer to FIG. 1 which is an output current vs. UV intensity plot of a UV detector, showing how the UC detector works. In this figure, the UV intensity is represented by a Solar UV Index. Solar UV Index estimates the average maximum solar ultraviolet radiation (UV) at the Earth's surface. The Index is generally presented as a forecast of the maximum amount of skin-damaging UV expected to reach the Earth's surface at solar noon. The values of the Index range from zero upward and the higher the Index number, the greater the likelihood of skin and eye damaging exposure to UV, and the less time it takes for damage to occur. As shown, the output current of the UV detector is proportional to the UV intensity. Therefore, the output current data can be used to represent the UV intensity for the following discriminating procedures.

Figure 2:
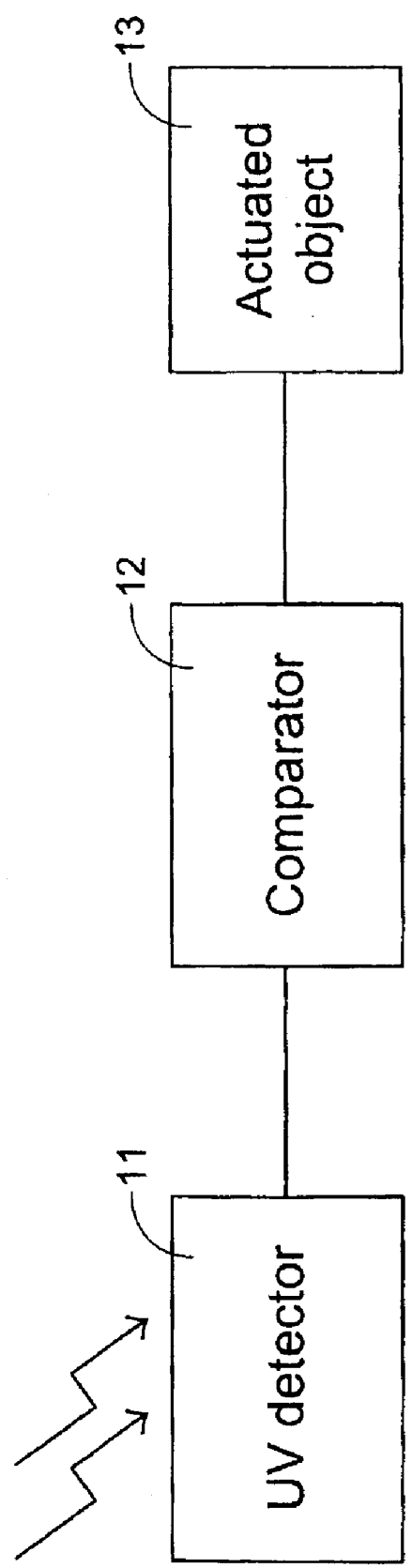
FIG. 2 is a functional block diagram of a device automatically actuated in response to a certain level of UV intensity according to the present invention.

Please refer to FIG. 2 which is a functional block diagram of a device automatically actuated in response to a certain level of UV intensity according to the present invention. The device comprises a UV detector 11, a comparator 12 and an actuated object 13. The output current data indicative of the UV intensity received by the detector 11 is outputted to the comparator 12 to be compared with a threshold value. When the comparison result indicates a predetermined correlation, e.g. the output current is higher or lower than the threshold value, is complied with, the state of the actuated object will be changed. Embodiments will be described as follows for facilitating the understanding of the present invention.

Figure 3:
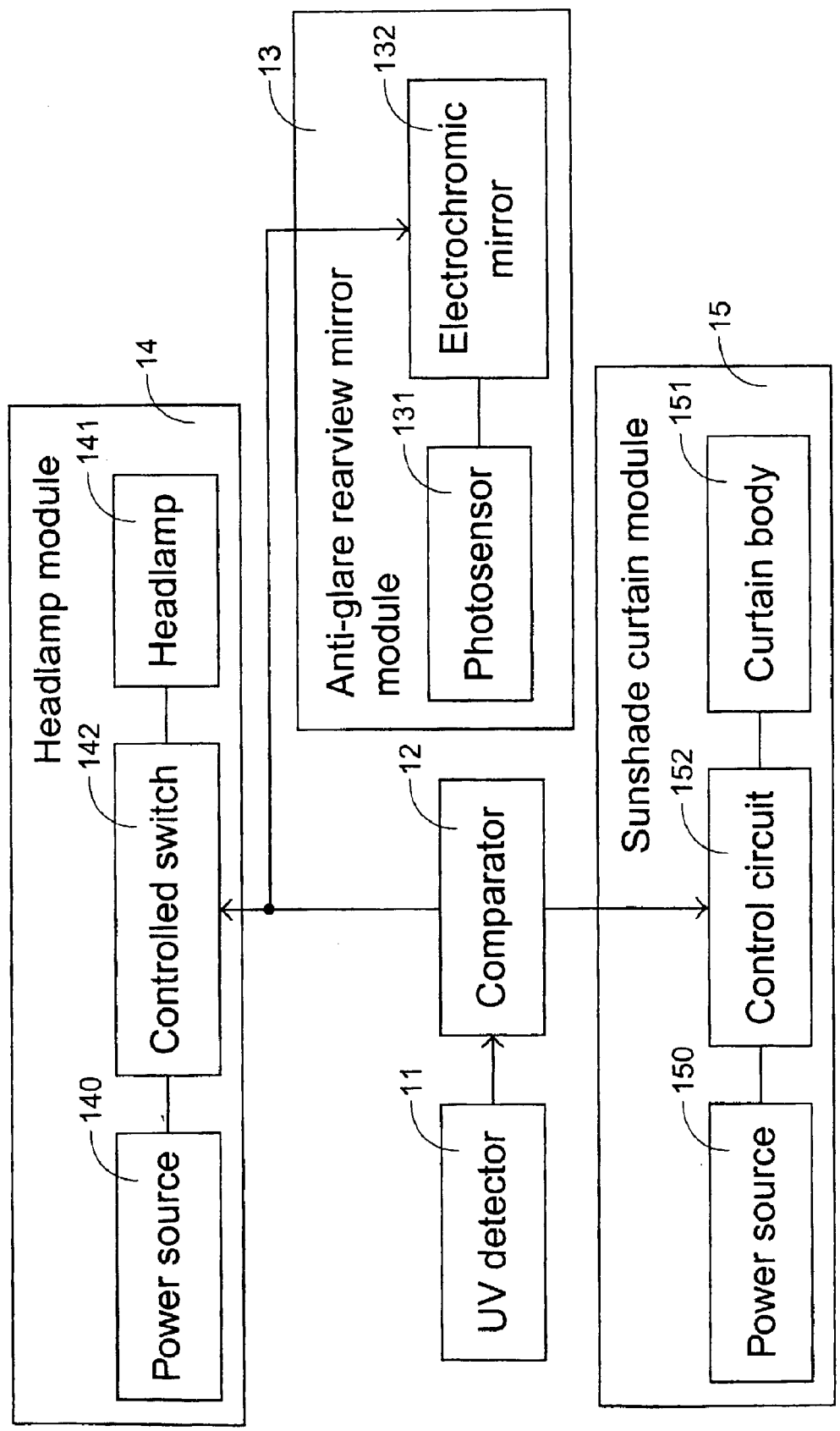
FIG. 3 is a functional block diagram of a device automatically actuated in response to a certain level of UV intensity according to a preferred embodiment of the present invention, for being applied to a vehicle to activate various functions.

A first preferred embodiment of the device is applied to a vehicle to activate various functions. Please refer to FIG. 3. The UV detector 11 is mounted the vehicle at any proper place where the UV radiation can be received. For example, the UV detector 11 can be mounted on the vehicular roof, front or rear windscreen. The output current data from the UV detector 11 is transmitted to the comparator 12 to be compared with a threshold value. If the output current is higher than the threshold value, it is determined that the UV radiation is too strong. Therefore, an actuating signal is asserted by the comparator 12 to a sunshade curtain module 15 to block sunlight from entering the vehicle. The sunshade curtain module 15 includes a power source 150, s curtain body 151 and a control circuit 152. The control circuit 152 is in communication with the comparator 12. The actuating signal is transmitted from the comparator 12 to the control circuit 152 by way of electric transmission, wireless transmission, or any other suitable transmission manner. Then, the control circuit 152 asserts a control signal to allow the power signal from the power source 150 to be transmitted to the curtain body. In response to the power signal, the curtain body 151 moves to shield a window of the vehicle so as to block the sunlight to an extent depending on the material of the curtain body.

Since there are plural windows in a vehicle, more than one curtain body is preferred to be provided for achieving the sunlight blocking purpose. All the curtain bodies can be controlled by the single control circuit 152 to move at the same time. Alternatively, a plurality of UV detectors and a plurality of control circuits can be provided to control respective curtain bodies. Under this circumstance, the UV detectors are preferably arranged at different positions on the vehicle, e.g. front windscreen, rear windscreen, left-side window and right-side window.

Furthermore, it is understood that the movement manner of the curtain body 151 varies with the curtain design. For example, the curtain body 151 may ascend from a hidden position or stretched from a rolled configuration to shield the window.

On the other hand, when the output current value becomes lower than the threshold value, it means the UV intensity becomes weak, so the curtain body 151 is recovered to its original hidden state. If the output current is further smaller than another threshold value, which can be the same as but preferably different from the above-mentioned threshold value, it is determined that the environment becomes a little bit too dark. Therefore, another actuating signal is asserted by the comparator 12 to automatically turn on the headlamp module 14 and/or activating anti-glare function of the rearview mirror module 13.

The headlamp module 14 includes a power source 140, a headlamp 141 and a controlled switch 142. The controlled switch 142 is in communication with the comparator 12 and conducted in response to the actuating signal from the comparator 12. The actuating signal is transmitted from the comparator 12 to the controlled switch 142 by way of electric transmission, wireless transmission, or any other suitable transmission manner. When the controlled switch 142 is conducted, the power signal is allowed be transmitted from the power source 140 to the headlamp 141 to illuminate. Of course, the headlamp 141 can be turned off in response to the suspension of the actuating signal or a contrarily actuating signal if the comparison result indicates the output current value becomes higher than the relevant threshold value. In this embodiment, in spite of taking a headlamp as an example, it is understood that other vehicular lamps can be automatically actuated in a similar way.

The comparator 12 is further in communication with an electrochromic mirror 132 of the anti-glare rearview mirror module 13. The rearview mirror module 13 includes the electrochromic mirror 132 and a photosensor 131. The photosensor 131 is generally but not necessarily mounted on the interior rearview mirror, and oriented rearwards to detect light from other vehicles behind the present vehicle. When the electrochromic mirror 132 receives an actuating signal from the comparator 12 due to the output current value smaller than a threshold value, which can be the same as or different from the threshold value used for the headlamp module 14, it asserts a control signal to activate the anti-glare function. In response to the control signal, the light intensity detected by the photosensor 131 is referred to determine how the reflectance of the electrochromic mirror 132 changes. If the light intensity detected by the photosensor 131 exceeds a threshold, the color of the electrochromic mirror 132 is deepened to reduce the reflectance thereof, and preferably varies with the detected light intensity, thereby effectively eliminating the glare effect. When the strong rearward light is removed, the color of the electrochromic mirror 132 is recovered to obtain normal reflectance. Further, when the output current becomes higher than the threshold value, the anti-glare function is preferably disabled for the consideration of the lifespan of the electrochromic mirror. In addition to a reflective mirror, the electrochromic mirror 132 can also be a liquid crystal display or any other image display device having a changeable reflectance state in order to achieve the anti-glare purpose.

Figure 4:
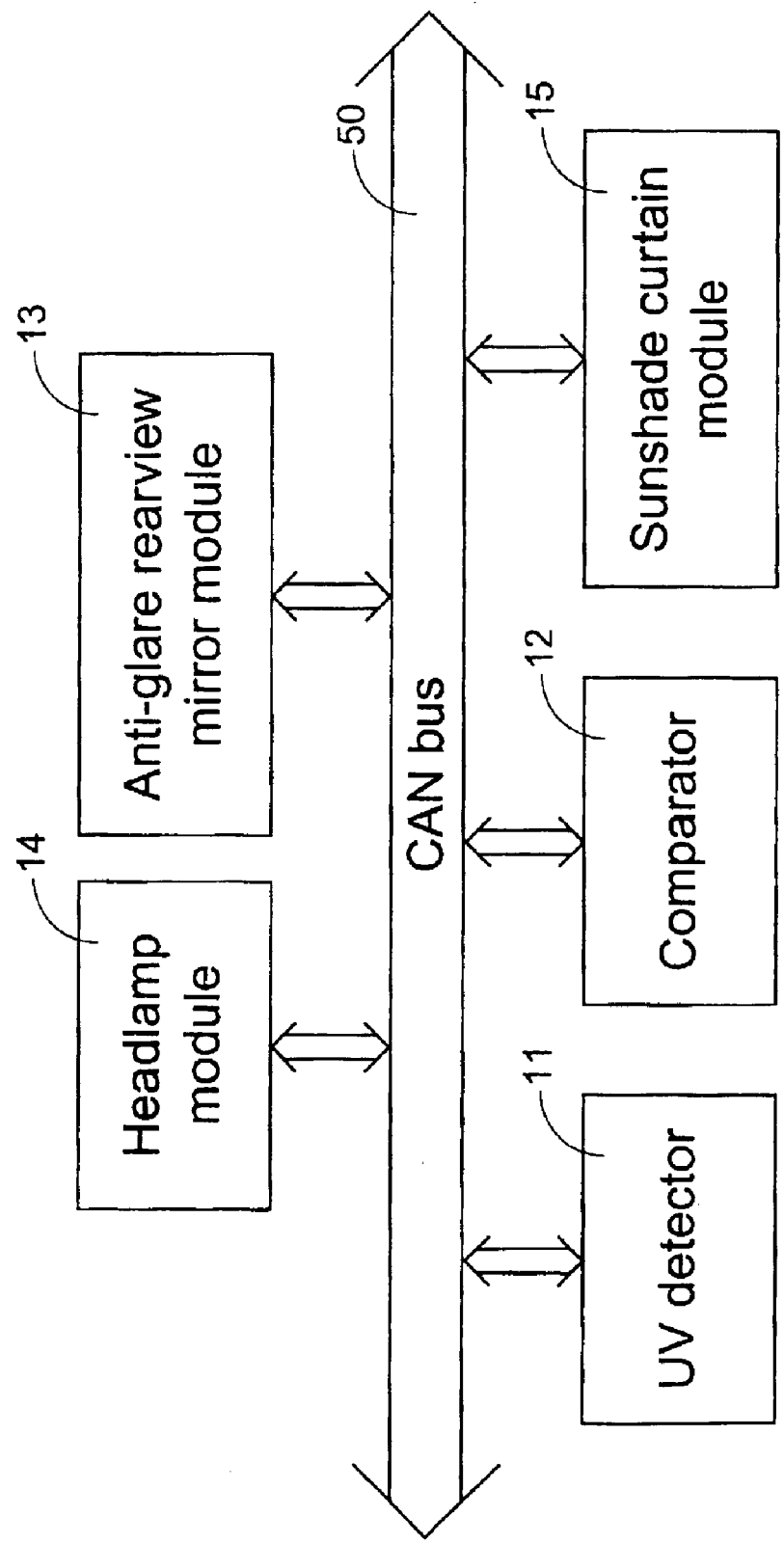
FIG. 4 is a schematic diagram showing the intercommunication of elements in the vehicular system of FIG. 3.

As mentioned above, the transmission of the actuating signal can be electrically or wirelessly conducted. In addition, a vehicular digital bus such as a controller area network (CAN) or a vehicular area network (VAN) bus can be used to transmit signals among those and other module units in the vehicle. Please refer to FIG. 4. The UV detector 11, the comparator 12, the anti-glare rearview mirror module 13, the headlamp module 14 and the sunshade curtain module 15 are all connected to a CAN bus 50. The actuating signal from the UV detector 11 is encoded and outputted to the CAN bus 50, and received and decoded by the relevant module(s) to perform required state change mentioned above. The transmission via the vehicular digital bus simplifies the wiring of the vehicle and minimizes the cable amount and vehicle weight as well.

Figure 5:
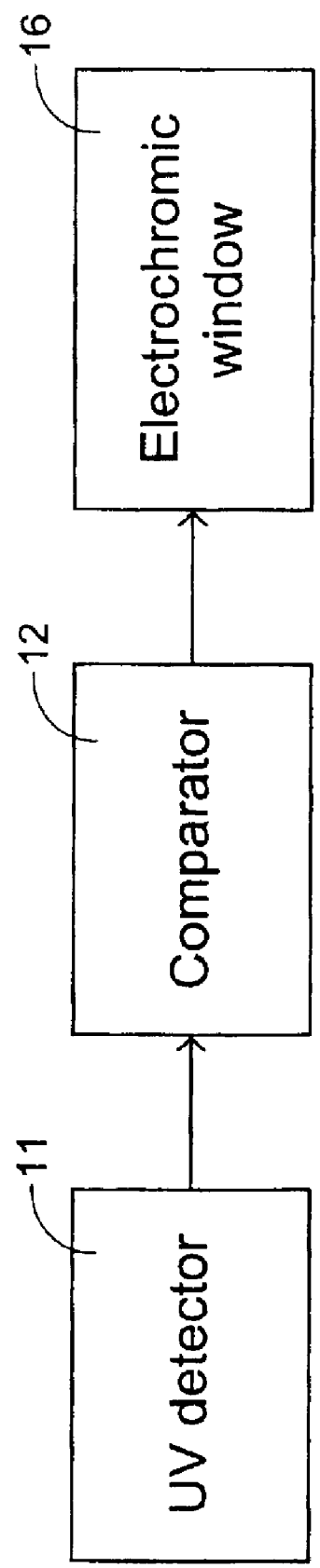
FIG. 5 is a functional block diagram of a device automatically actuated in response to a certain level of UV intensity according to a preferred embodiment of the present invention, for being applied to a building to block UV radiation.

A second preferred embodiment of the device is applied to a building to block UV radiation. Please refer to FIG. 5. The UV detector 11 is mounted on the building at any proper place where the UV radiation can be received. For example, the UV detector 11 can be mounted on the outside wall of the building or somewhere in the building near the window. The output current data from the UV detector 11 is transmitted to the comparator 12 to be compared with a threshold value. If the output current is higher than the threshold value, it is determined that the UV radiation is too strong. Therefore, an actuating signal is asserted by the comparator 12 to an electrochroimic window 16 to change the color and thus the transmittance of the window 16, thereby blocking UV radiation to an extent. All the windows of the building can be integrally or separately changed depending on the practical design. In this embodiment, an electrochromic window having electrochromic unit between glasses is taken as an example to block the sunlight from entering the building. In addition to color change, the transmittance of the window can also be controlled by the alignment of liquid crystal molecules between glasses if the window is designed as a liquid crystal window.

In addition to electrochromic or liquid-crystal window(s), the sunshade curtain of the building, if any, can also be automatically moved in a way similar to that described in the vehicle embodiment. Likewise, in the vehicle embodiment shown in FIG. 3, the windows of the vehicle can also be electrochromic or liquid-crystal windows so that the anti-UV effect can be alternatively or further achieved by changing the transmittance of the windows.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A device automatically actuated according to UV intensity, comprising:
    a UV detector generating an electric signal indicative of a UV intensity of a light received thereby;
    a comparator in communication with said UV detector, receiving said electric signal to compare said UV intensity with a first threshold value, and asserting an actuating signal when said UV intensity is in a predetermined correlation with said first threshold value; and
    an actuated object in communication with said comparator, actuated to change a state thereof in response to said actuating signal.

2. The device according to claim 1 wherein said actuating signal is asserted when said UV intensity is lower than said first threshold value.

3. The device according to claim 2 wherein said actuated object is an anti-glare rearview mirror module of a vehicle, comprising:
    a photosensor oriented to receive a rearward light of said vehicle and asserting a control signal when an intensity of said rearward light is higher than a second threshold value; and
    an electrochromic mirror in communication with said photosensor, changing a reflectance thereof in response to said actuating signal and said control signal.

4. The device according to claim 3 wherein said actuated object is a lamp module in communication with said comparator, changing from an OFF state to an ON state to illuminate in response to said actuating signal.

5. The device according to claim 4 wherein said lamp module is changed from said ON state to said OFF state to be put out and said reflectance of said electrochromic mirror recovers to an unchanged initial value when said UV intensity becomes higher than said first threshold value.

6. The device according to claim 2 wherein said actuated object is a headlamp module of a vehicle, comprising:
    a headlamp actuated to illuminate in response to a power signal from a power source; and
    a controller switch electrically connected to said headlamp, said power source and said comparator, conducted to allowing said headlamp to receive said power signal when said UV intensity is lower than said first threshold value, and off-circuited to stop said headlamp to receive said power signal when said UV intensity is higher than said first threshold value.

7. The device according to claim 1 wherein said actuating signal is asserted when said UV intensity is higher than said first threshold value.

8. The device according to claim 7 wherein said actuated object is a sunshade curtain module in communication with said comparator, changing from an OFF state to an ON state to block sunlight in response to said actuating signal.

9. The device according to claim 8 wherein said sunshade curtain module is changed from said ON state to said OFF state to retract when said UV intensity becomes lower than said first threshold value.

10. The device according to claim 7 wherein said actuated object is a sunshade curtain module of a vehicle, comprising:
    a curtain body actuated to move in response to a power signal from a power source; and a control circuit electrically connected to said curtain body, said power source and said comparator, allowing said curtain body to receive said power signal to move in a first direction so as to shield a window of said vehicle when said UV intensity is higher than said first threshold value, and allowing said curtain body to receive said power signal to move in a second direction so as to expose said window when said UV intensity is lower than said first threshold value.

11. The device according to claim 7 wherein said actuated object is a window in communication with said comparator, changing from an initial transmittance state to a lower transmittance state in response to said actuating signal.

12. The device according to claim 11 wherein said window is changed from said lower transmittance state to said initial transmittance state when said UV intensity becomes lower than said first threshold value.

13. The device according to claim 12 wherein said window is a window of a vehicle or a building.

14. The device according to claim 1 wherein said device automatically actuated according to UV intensity is applied to a vehicle, and said UV detector, said comparator and said actuated object communicate with one another via a vehicular digital bus.

15. The device according to claim 14 wherein said vehicular digital bus is a controller area network (CAN) bus or a vehicle area network (VAN) bus.

16. A device automatically actuated to prevent strong UV radiation from entering a vehicle, comprising:
   a UV detector mounted on said vehicle, and generating an electric signal indicative of a UV intensity of a light received thereby;
   a comparator in communication with said UV detector, receiving said electric signal to compare said UV intensity with a first threshold value, and asserting an actuating signal when said UV intensity is higher than said first threshold value; and
   an actuated object in communication with said comparator, actuated to change a state thereof in response to said actuating signal.

17. The device according to claim 16 wherein said actuated object is a sunshade curtain module in communication with said comparator, changing from an OFF state to an ON state to block sunlight in response to said actuating signal.

18. The device according to claim 17 wherein said sunshade curtain module of a vehicle, comprising:
   a curtain body actuated to move in response to a power signal from a power source; and
   a control circuit electrically connected to said curtain body, said power source and said comparator, allowing said curtain body to receive said power signal to move in a first direction so as to shield a window of said vehicle when said UV intensity is higher than said first threshold value, and allowing said curtain body to receive said power signal to move in a second direction so as to expose said window when said UV intensity is lower than said first threshold value.

19. The device according to claim 16 wherein said actuated object is an electrochromic window in communication with said comparator, changing from an initial transmittance state to a lower transmittance state in response to said actuating signal.

20. The device according to claim 16 wherein said UV detector, said comparator and said actuated object communicate with one another via a controller area network (CAN) bus or a vehicle area network (VAN) bus.

21. A device automatically actuated to prevent strong UV radiation from entering a building, comprising:
   a UV detector mounted on said building, and generating an electric signal indicative of a UV intensity of a light received thereby;
   a comparator in communication with said UV detector, receiving said electric signal to compare said UV intensity with a first threshold value, and asserting an actuating signal when said UV intensity is higher than said first threshold value; and
   an actuated object in communication with said comparator, actuated to change a state thereof in response to said actuating signal.

22. The device according to claim 21 wherein said actuated object is a sunshade curtain module or an electrochromic window.

* * * * *